United States Patent
Krauss et al.

(10) Patent No.: US 9,812,017 B2
(45) Date of Patent: Nov. 7, 2017

(54) DETECTION DEVICE FOR A MOTOR VEHICLE AND ASSOCIATED METHODS FOR DETECTING AN OBSTACLE AND FOR OPENING A MOVABLE PANEL OF THE MOTOR VEHICLE

(71) Applicant: U-SHIN FRANCE, Creteil (FR)

(72) Inventors: Dietmar Krauss, Erdweg (DE); Hervé Calor, Créteil (FR)

(73) Assignee: U-SHIN FRANCE SAS, Creteil (FR)

( * ) Notice: Subject to any disclaimer, the term of this patent is extended or adjusted under 35 U.S.C. 154(b) by 0 days.

(21) Appl. No.: 15/027,530

(22) PCT Filed: Oct. 8, 2014

(86) PCT No.: PCT/EP2014/071576
§ 371 (c)(1),
(2) Date: Apr. 6, 2016

(87) PCT Pub. No.: WO2015/052258
PCT Pub. Date: Apr. 16, 2015

(65) Prior Publication Data
US 2016/0247403 A1    Aug. 25, 2016

(30) Foreign Application Priority Data
Oct. 10, 2013    (EP) ..................................... 13188136

(51) Int. Cl.
*B60R 25/10*    (2013.01)
*G08G 1/16*    (2006.01)
(Continued)

(52) U.S. Cl.
CPC ......... *G08G 1/166* (2013.01); *B60R 25/2054* (2013.01); *B60R 25/31* (2013.01)

(58) Field of Classification Search
CPC .... B60R 25/2054; B60R 25/31; B60R 25/048
(Continued)

(56) References Cited

U.S. PATENT DOCUMENTS 7,333,012 B1    2/2008 Nguyen
2003/0222758 A1    12/2003 Willats et al.
(Continued)

FOREIGN PATENT DOCUMENTS

DE    102008021989 A1    12/2008
DE    102010001579 A1    8/2011
FR    2979873 A1    3/2013

OTHER PUBLICATIONS
International Search Report issued in PCT/EP2014/071576 dated Jan. 7, 2015 (3 pages).
(Continued)

*Primary Examiner* — Tai T Nguyen
(74) *Attorney, Agent, or Firm* — Osha Liang LLP

(57) ABSTRACT

The invention relates to a detection device (1) for a motor vehicle (VI) comprising at least one optical detector (3). Said at least one optical detector (3) being configured for detecting the approach of a person (U) in a predefined area in the vicinity of the vehicle in order to activate opening command means of a device for opening a movable panel (5, 7) of the vehicle (VI). According to the invention: —said detection device (1) comprises switching means for switching the function of the at least one optical detector (3) to a detecting function of an obstacle (V2) at a predefined distance of the vehicle (VI) when the identifier of an authorized person (U) is detected inside the vehicle (VI) and the vehicle movable panels (5, 7) are closed, and wherein— said detection device (1) comprises processing means configured to react depending on a detection of an obstacle (V2) by the optical sensor (3). The invention also relates to corresponding methods for detecting obstacles and for opening a movable panel of the motor vehicle.

11 Claims, 3 Drawing Sheets

(51) Int. Cl.
  *B60R 25/20*   (2013.01)
  *B60R 25/31*   (2013.01)

(58) Field of Classification Search
  USPC ...................................................... 340/426.2
  See application file for complete search history.

(56) References Cited

U.S. PATENT DOCUMENTS

| | | | |
|---|---|---|---|
| 2004/0257267 A1* | 12/2004 | Mafune ................. | B60R 25/246 342/107 |
| 2008/0266396 A1* | 10/2008 | Stein ................... | G06K 9/00805 348/148 |
| 2008/0296926 A1 | 12/2008 | Hanzel et al. | |
| 2010/0220189 A1* | 9/2010 | Yanagi ..................... | B60R 1/00 348/148 |
| 2012/0056734 A1 | 3/2012 | Ikeda et al. | |
| 2012/0158253 A1* | 6/2012 | Kroemke ............ | B60R 25/2054 701/49 |

OTHER PUBLICATIONS

Written Opinion of the International Searching Authority issued in PCT/EP2014/071576 dated Jan. 7, 2015 (5 pages).

* cited by examiner

DETECTION DEVICE FOR A MOTOR VEHICLE AND ASSOCIATED METHODS FOR DETECTING AN OBSTACLE AND FOR OPENING A MOVABLE PANEL OF THE MOTOR VEHICLE

BACKGROUND OF THE INVENTION

Field of the Invention

The invention relates to a detection device for a motor vehicle comprising at least one optical detectors generally used for detecting a person approaching in the vicinity of the vehicle in a method for opening a movable panel of a motor vehicle.

The invention also relates to a corresponding method for detecting an obstacle at a predefined distance of the vehicle. The invention also relates to an associated method for opening a movable panel of the motor vehicle.

Description of Related Art

There are known devices for opening a movable panel of a motor vehicle using the physical contact of the hand or finger of the user to a switch or handle for opening said movable panel of the motor vehicle after unlocking. The movable panel is typically a trunk or a side door.

However, this type of opening requires the user to have a free hand. Thus, as an example if the user has all his hands already occupied or is unable to use his hands, there is a need to allow the opening of a movable panel of a motor vehicle without the use of physical contact of the user's hands with the switch or handle.

For that purpose, it is known to provide an opening device of a movable panel in which a sensor is used to activate a command for opening the movable panel.

Meanwhile, it is necessary to detect the presence of a person in the vicinity of the vehicle and verify if this person is an authorized person to unlock the vehicle so that the opening device can command the opening of the movable panel when an authorized person is detected.

However, since the opening of the vehicle is allowed, it is necessary to prevent intrusion of an unauthorized person in the vehicle.

For that purpose, it is known to verify if the person is authorized to unlock the vehicle and then projecting for example on the ground, light spot, to identify an intention for opening the movable panel by placing or moving a human part, a hand or a foot, in a predetermined manner in order to obscure the light spot for example.

It is also known to use the detection device in order to delay a commanded closure of a vehicle door until the person is out of the approach detection area. The detection device for detecting the presence of a person in the vicinity of the vehicle before authentication and command of the opening or in case of a closing command of the movable panel by an authorized person, is generally idled or deactivated, when the user identifier is detected inside the vehicle and all doors are closed.

Moreover, motor vehicles currently have driving aids with further detection means such as parking sensors, collision avoidance system, blind spot detection, and so on.

BRIEF SUMMARY OF THE INVENTION

The object of the present invention is to provide a detection device reducing the cost of such detection means.

This object is achieved according to the invention by a detection device for a motor vehicle comprising at least one optical detector, said at least one optical detector being configured for detecting the approach of a person in a predefined area in the vicinity of the vehicle in order to activate opening command means of a device for opening a movable panel of the vehicle, wherein:

said detection device comprises switching means for switching the function of the at least one optical detector to a detecting function of an obstacle at a predefined distance of the vehicle when the identifier of an authorized person is detected inside the vehicle and the vehicle movable panels are closed, and wherein said detection device comprises processing means configured to react depending on a detection of an obstacle by the optical detector.

Thanks to the invention, the same optical detection than the one used for detection approach for a device for opening a movable panel of the vehicle, is used to detect a potential obstacle too close from the vehicle, in order to avoid a collision with this obstacle, which enables a reduction the cost.

The device according to the invention may also comprise one or more of the following features, taken separately or in combination:

said detection device is for a motor vehicle comprising a steering column lock with an ignition switch able to switch from a locking position of the steering column and at least one unlocking position of the steering column, and said switching means are configured to switch the function of the at least one optical detector to a detecting function of an obstacle at a predefined distance of the vehicle when the identifier of an authorized person is detected inside the vehicle, the vehicle movable panels are closed and the ignition switch is in an unlocking position;

the processing means are configured to send a warning signal to the user in reaction of an obstacle detection by the optical detector at a predefined distance of the vehicle;

the warning signal may be a visual signal and/or a signal tone;

the optical detector is an infrared detector;

the optical detector is configured to detect an obstacle at a predefined distance of the vehicle when the engine of the vehicle is stopped or is idle;

the optical detector is configured to detect an obstacle at a predefined distance of the vehicle when the vehicle is in motion;

the optical detector is configured to detect a moving obstacle;

the optical detector is configured to detect an immobile obstacle.

The invention also relates to a method for detecting obstacles at a predefined distance of a motor vehicle, comprising the following steps of:

detecting an identifier of an authorized person inside the vehicle, detecting if the movable panels of said vehicle are closed, switching the function of at least one optical detector of a detection device as set forth in any one of the preceding claims used for approach detection in a control device for opening a movable panel of a motor vehicle to a function for detecting obstacles at a predefined distance of the vehicle, detecting an obstacle at the predefined distance from the vehicle, if an obstacle is detected, warning the user of the vehicle, for example by sending one or more warning signals to the attention of the user.

The invention also relates to a method for opening a movable panel of the motor vehicle using a detection device as defined before, comprising the following steps of:

- detecting the approach of a person in the vicinity of the vehicle by one or more optical detectors of the detection device,
- authenticating an identifier of the detected person as authorized to unlock the vehicle through authentication means,
- authorizing the opening of the movable panel when an authorized person is authenticated, and
- deactivating the optical detector function for detecting a person in the vicinity of the vehicle when the identifier of the authorized person is detected inside the vehicle and activating the function of detecting obstacles at a predefined distance of the vehicle.

BRIEF DESCRIPTION OF THE DRAWINGS

Other features and advantages of the invention will emerge more clearly on reading the following description, which is given as a non-limiting illustrative example, and the attached drawings, among which.

In these figures, identical elements have the same references.

DETAILED DESCRIPTION OF THE INVENTION

Detection Device for a Motor Vehicle

Figure 1:
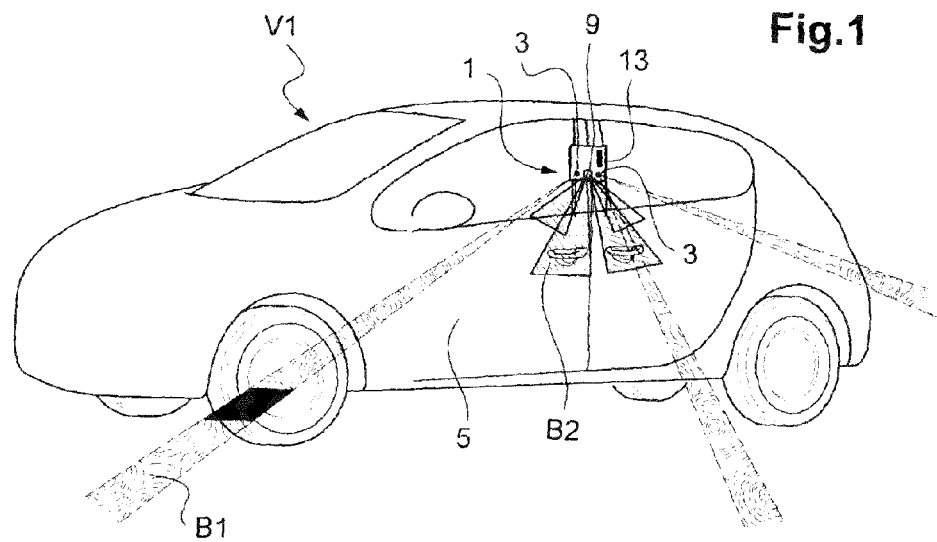
FIG. 1 is a perspective view showing a motor vehicle with a detection device according to the invention arranged on a side door of the vehicle for detecting a person in the vicinity of the vehicle before activating a control device for opening a movable panel of the motor vehicle.
Figure 2:
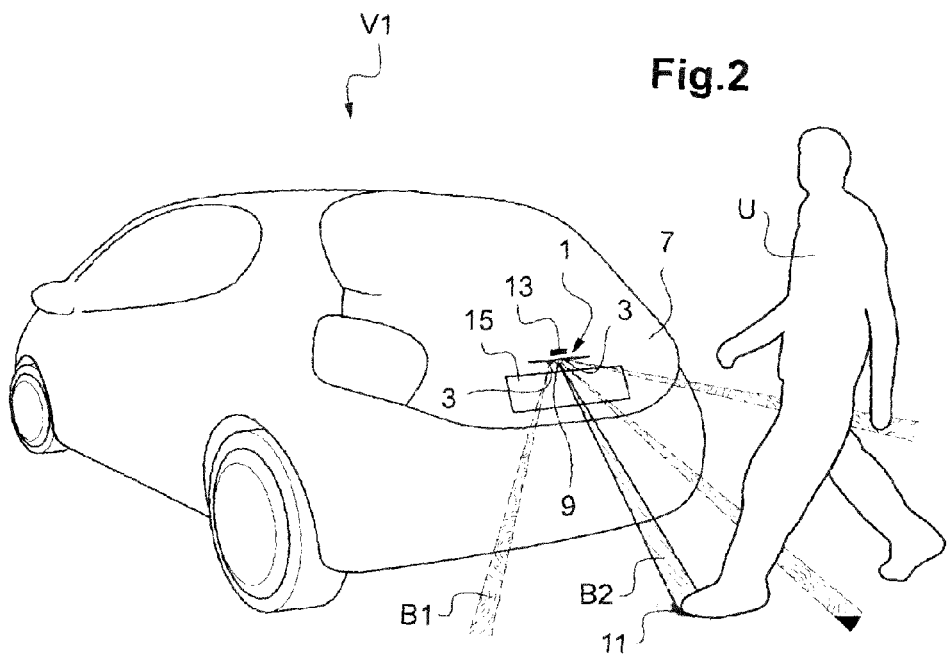
FIG. 2 is a perspective view showing a motor vehicle with a detection device according to the invention arranged on the tailgate of the vehicle for detecting a person in the vicinity of the vehicle before activating a control device for opening a movable panel of the motor vehicle.
Figure 3:
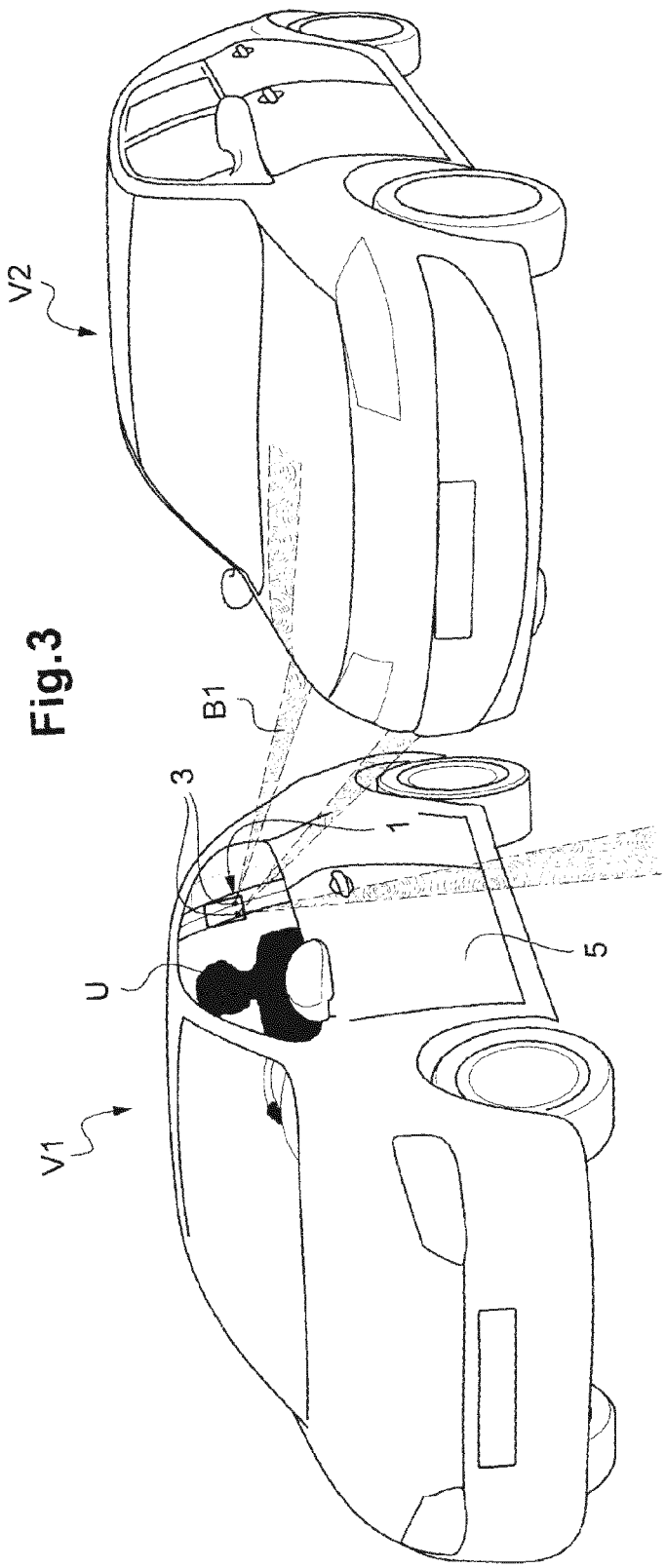
FIG. 3 shows an example of detection of an approaching vehicle in the blind spot of a first vehicle which is detected using the detection device of FIG. 1 or 2.

Referring to FIGS. 1 and 2, the invention relates to a detection device 1 for a motor vehicle V1 comprising at least one optical detector 3 intended to be used for detecting the approach of a person U, also called user U, in the vicinity of the vehicle V1 in order to activate opening command means of an opening control device for opening a movable panel 5, 7 of the vehicle V1 if the detected person U is an authorized person to unlock the vehicle V1. The one or more optical detectors 3 of the detection device 1 are also used for detecting an obstacle V2 near the vehicle V1, as represented in a schematic way in FIG. 3, when the authorized person identifier is detected inside the vehicle.

In addition, the first function of detection of an approaching person for activating the opening control device may be idled or deactivated when the user identifier is detected inside the vehicle V1 and the vehicle movable panels 5, 7 are closed and the second function of detection an obstacle may be activated.

The detection device 1 comprises switching means for activating the second function of the optical detector 3 when the user identifier is detected inside the vehicle V1, and the vehicle movable panels 5, 7 are closed. Of course, the second function of the optical detector 3 may be activated if the car is not sleeping, in other words an ignition switch is not in a locking position. Indeed, the vehicle may comprise a steering column lock for locking the operation of the steering column, provided with an ignition switch. The ignition switch is able to switch from a locking position to at least one unlocking position when an authorized identifier of the user is detected, such as a contact position or an ignition position depending on the rotary position of the steering, column. In the contact position, the electrical equipments in the vehicle may be ON. In the ignition position, the engine starts.

Thus, the detection device 1 comprises means for detecting the state of the movable panels 5, 7 of the vehicle, meaning if they are opened or are closed.

The detection device 1 may also comprise means for verifying the position of the ignition switch.

The opening control device 1 may comprise means for sending an idling signal to the optical detector 3 in order to deactivate the function of detection of an approaching person for activating the opening command means of the opening control device. Indeed, the optical detector 3 switches from the function of a person detection in the vicinity of the vehicle in order to activate opening command means for opening the movable panel 5, 7, to a function of detection of an obstacle at a predefined distance from the vehicle for instance for driving aids.

The optical detector 3 is mounted on the vehicle V1. According to one embodiment, the optical detector 3 is arranged on the vehicle movable panel 5, 7 to be opened, such as a side door 5 or a tailgate 7.

The optical detector 3 comprises a transmitter and a receiver. The transmitter is able to project a detection beam B1. Advantageously, the projected detection beam B1 is of wavelength of invisible spectrum for human, infrared beam in a preferred embodiment. Thus, the optical detector 3 is advantageously an infrared detector 3 comprising for example infrared light-emitting diodes and photo-diodes.

The transmitter is further configured to project long reach detection beams B1. For instance, the detection beams B1 may reach 0.5 to one meter for example for side door, and for the tailgate the detection beams B1 may reach around 1.5 meter.

Hereafter, two vehicle on-board devices using the same optical detector 3 are described: firstly the opening control device for opening a movable panel 5, 7 of the motor vehicle V1, and secondly a driving aids that may be used when the vehicle V1 is stopped or in motion.

a) Opening Control Device

The opening control device comprises as said before at least one optical detector 3 for detecting a person approaching in the vicinity of the vehicle V1.

The opening control device further comprises authentication means (not illustrated) for verifying that the detected person U near the vehicle V1 is an authorized person for unlocking the vehicle V1. Authentication means may comprise an antenna able to communicate with an identifier such as a transponder carried by the user U, for example in the key, or disposed adjacent to the user U. The transponder is adapted to receive a signal sent by the antenna.

The antenna is connected to identifying means on-board. This identifying means may determine if the person holding or adjacent to the transponder is an authorized person.

The opening control device further comprises location means for determining if the user identifier is detected inside the vehicle V1 or outside the vehicle V1.

The opening control device further comprises activation means for activating opening command means when an authorized person is authenticated outside the vehicle V1.

According to a preferred embodiment, the opening command means comprise light projection means 9 of a light beam B2. The light projection means 9 are mounted on the vehicle V1, for example on the movable panel 5, 7 such as a side door 5 (FIG. 1) or the tailgate 7 (FIG. 2).

The light projection means 9 may comprise one or more diodes to achieve the light beam B2. The light beam B2 may be of any color.

The light beam B2 may be projected near the handle of the movable panel 5, 7 as shown in FIG. 1 or on the ground on which the vehicle V1 stands thus forming a light pattern 11 on the ground as shown in FIG. 2. The light pattern 11 may be of any shape, including a luminous round, an arrow indicating the direction of movement of the foot, a cross. The light pattern 11 may comprise one or a plurality of shapes, for example several rounds or a set of arrows.

The opening command means comprise determination means for determining whether a placement or movement of one human part, such as one hand or foot, is made in accordance with a predetermined manner and if the movable panel 5, 7 can be opened or not.

The predetermined manner can comprise the direction of a movement of the human part, such as hand or foot, and/or the time during which the human part, such as hand or foot, interrupts the light beam B2 or obscures the light pattern 11. This advantageously avoids that an impromptu object such as a tree branch or a small animal may activate the movable panel 5, 7 opening by interacting with the light beam B2 or the virtual switch formed by the light pattern 11 on the ground.

One or more optical sensors 13 may be configured to detect any variation from the light beam B2. According to the embodiment of FIG. 1, the optical sensors 13 are arranged on the vehicle side door 5. According to the embodiment of FIG. 2, the optical sensors are arranged on the tailgate 7.

The optical detector 3, the light projection means 9 and the optical sensors 13 associated to the light beams B2 may be arranged close relative to each other, for example on the door frame as illustrated in FIG. 1 or for example on the rear registration plate 15 as illustrated in FIG. 2.

The optical sensors 13 are intended to detect any variation in brightness due to interception of a light beam B2 by an object or by a human part, such as foot or hand. The optical sensors 13 may be connected to the determination means which determines that the movement has or has not been done properly, meaning according to the predetermined manner. The determination means may trigger the opening of the movable panel 5, 7 when the movement has been done properly or not to trigger the opening of the movable panel 5, 7 when the movement has not been done properly.

b) Driving Aids

Thus, the same optical detector 3 of the detection device 1 used in the opening control device is also used to detect an obstacle at a predefined distance of the vehicle V1 when the user, and more precisely the identifier of the user, is detected inside the vehicle V1, and the movable panels 5, 7 of the vehicle are closed. Further, this second function of the optical detector 3 may be activated if the ignition switch is in an unlocking position.

The first function for detecting a person U approaching the vehicle V1 in order to activate the opening command means when the detected person is an authorized person U may be deactivated.

As a non limited illustrating example, the predefined distance may be as a non limiting example from 0.5 meter to one meter from the vehicle V1. It might be possible that the user U may configure the predefined distance.

Such a detection of obstacles at a predetermined distance from the vehicle V1 is useful in driving aids notably.

The optical sensor 3 is configured to detect an obstacle at a predefined distance of the vehicle V1 when the engine of the vehicle V1 is stopped or is idle, meaning the vehicle V1 may be stopped or at a substantially zero speed.

The optical sensor 3 may also be configured to detect an obstacle at a predefined distance of the vehicle V1 when the vehicle V1 is in motion, even at high speed.

The optical sensor 3 may also detect an obstacle at a predefined distance of the vehicle V1 when the vehicle V1 is locked or unlocked.

The optical sensor 3 is configured to detect a moving obstacle. As an alternative or as a complement the optical sensor 3 is configured to detect an immobile obstacle.

The detection device 1 further comprises processing means configured to react depending on a detection of an obstacle by the optical sensor 3, for example by sending one or more warning signals when an obstacle is detected by the optical sensor 3, so that the user U is warned and may stop its dangerous action. The warning signal may be a visual signal and/or a signal tone.

For example, when the user U gets into the vehicle V1, by using for instance the opening control device previously described, and after having closed the movable panel 5, 7, the user U may want to get out of the vehicle V1 and thus may want to open again the previously closed movable panel 5, 7 or once installed in the vehicle V1 the user U may want to move the vehicle V1 for instance previously parked.

Considering the first case, when the user U wants to open the movable panel 5, 7, an obstacle, and more particularly a moving obstacle such as another vehicle V2 may approach in the vicinity of the user vehicle V1, so that the other vehicle V2 may be in the opening area of the movable panel 5, 7 if the user U decides to open the movable panel 5, 7.

The optical detector 3 previously used in the case of contact-less opening of the movable panel 5,7 is configured to detect this potential obstacle, in this example moving obstacle V2, when it is at a predefined distance from the user vehicle V1. Once the another vehicle V2 is detected by the optical detector 3, the processing means may send a warning signal to the user U. Upon reception of the warning signal, for example hearing and/or seeing a warning signal, the user U is aware of a potential danger and may stop opening the vehicle door, thus avoiding a collision with the another vehicle V2.

Considering the second case, when the user U installed in the vehicle V1 wants to move the vehicle V1 for instance previously parked. A moving obstacle such as another vehicle V2 may approach too close to the user vehicle V1, so that the another vehicle V2 may hinder or block the driving of the user vehicle V1.

As before, the optical detector 3 previously used in the case of contact-less opening of the movable panel 5,7 is configured to detect this potential obstacle, in this example moving obstacle V2, when it is at a predefined distance from the user vehicle V1. Once the another vehicle V2 is detected by the optical detector 3, the processing means may send a warning signal to the user U. Upon reception of the warning signal, for example hearing and/or seeing a warning signal, the user U is aware of a potential danger and may adapt the driving in order to avoid the collision between both vehicles V1 and V2.

Considering a third example, there the vehicle V1 of the user U being at high speed, and the user U wanting to change lane for example, a moving obstacle such as another vehicle V2 may be in the blind spot. In that case, the function of detection of an obstacle of the optical detector 3 may be activated when detected an intention to change lane of the vehicle, for example when the turn signals are activated or for instance through a camera system.

Once the other vehicle V2 is detected by the optical detector 3 at a predefined distance from the user vehicle V1, the processing means may send a warning signal to the user U. Upon reception of the warning signal, for example hearing and/or seeing a warning signal, the user U is aware of a potential danger and may adapt the driving in order to avoid the collision between both vehicles V1 and V2.

Furthermore, the user vehicle V1 has on-board electronics which may comprise one or more central units comprising one or more processing means, such as the authentication means, identifying means, determination means, activation means, means for sending an idling signal to the optical detector 3, processing means for sending warning signal(s), as previously described.

Figure 4:
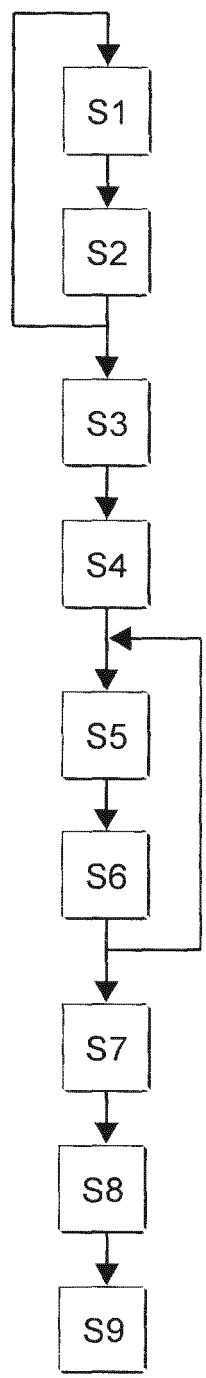
FIG. 4 is a diagram of an embodiment of a method for opening a movable panel of the motor vehicle using the detection device of FIG. 1 or 2.
Figure 5:
FIG. 5 is a diagram of an embodiment of a method for preventing the user in driving aids using the optical detector of the detection device used in the method for opening the movable panel.

Referring now to FIGS. 4 and 5, methods using the same optical detector 3 of the detection device 1 are described.

Method for Opening a Movable Panel of the Motor Vehicle a) Method for Opening a Movable Panel 5, 7 of the Motor Vehicle As shown in FIG. 4, the method for opening a movable panel 5, 7 of a motor vehicle comprises the following steps S1 to S9.

At step S1, detecting the approach of a person near the vehicle V1 by one or more optical detectors 3. For that, at least a portion of the body of a person U may be detected.

Once step S1 is performed and validated, meaning a person is detected, step S2 can begin.

At step S2, authenticating the detected person U as authorized to unlock the vehicle V1 through authentication means. That is a step to verify and validate the identity of a person to be entitled to access to the vehicle.

If an authorized person is authenticated, the method can perform step S3.

If the approaching person is not authenticated, step S1 starts again.

At step S3, activating opening command means for opening a movable panel 5, 7 of the motor vehicle, if an authorized person U is authenticated. Step S3 is only performed when steps S1 and S2 are validated.

According to a preferred embodiment, at step S4, light may be projected by one or more light-emitting diodes for example in the vicinity of the handle of the movable panel 5, 7, as the side door 5 as shown in FIG. 1. A light beam B2 may also be projected on the ground on which the motor vehicle V1 stands as shown in FIG. 2. In the latter case, the projected light beam B2 realizes a light pattern 11 on the ground on which the vehicle stands, forming a virtual switch.

At step S5, performing a predefined gesture command for opening a vehicle movable panel 5, 7. That means, the user U may place one human part, such as one hand or one foot, in the light beam B2, for example, the user U puts his foot in order to obscure or hide the virtual switch projected on the ground, in a predetermined manner. The user U may do or not a predefined movement.

The predefined gesture command may be made for a certain amount of time to be considered. This advantageously avoids any intrusion of an object or a small animal emerging and obscuring for example the light pattern on the ground to trigger the opening of the vehicle movable panel 5, 7 before the individual has interacted with the light pattern.

At step S6, identifying an authorized gesture command. That means identifying if the placement or movement of the foot or hand or any other human part, is made according or not to the predetermined manner. Step S6 allows the opening control device to identify if there is an intention to open the vehicle movable panel 5, 7.

If the placement or movement of the foot or hand for example is not performed in the predetermined manner, a signal may be sent to indicate to perform again the movement at step S5. In case it is necessary to repeat step S5, the user U must move his foot or hand for example to reposition it correctly according to the predetermined manner. The signal to reposition the human part such as hand or foot, may be a visual signal for example a flashing of the light beam B2, a change in color of the light beam B2, and/or a signal tone.

If the placement or movement is performed according the predetermined manner, a signal may be sent for authorizing the opening of the movable panel 5, 7 and the opening command means can open the movable panel 5, 7.

At step S7, opening the vehicle movable panel 5, 7 if an authorized gesture command has been performed. If the motion is performed according to a predetermined manner, the opening command means opens the vehicle movable panel 5, 7 at step S7. As a consequence, the opening of the vehicle movable panel 5, 7 is achieved only if the movement is made according to a precise manner.

Then, the movable panel 5, 7 is opened, the user U may get in the vehicle or put something in the trunk and the opening command means may be deactivated at step S8.

At step S9, the optical detector 3 function for detecting the approach of a person in the vicinity of the vehicle may be idled, when the user U is detected inside the car, and with the vehicle movable panels closed.

b) Method for Detecting Obstacles Re-Using the Optical Detector 3 for Approach Detection in a Method for Opening a Movable Panel 5, 7 of a Motor Vehicle.

At step S9 the optical detector 3 function associated to the method for opening a movable panel is idled.

If the user identifier is detected inside the vehicle V1 and if the vehicle doors are closed the function for detecting obstacles is activated.

The method thus comprises preliminary steps of detecting the user identifier inside the vehicle V1 and of verifying if the vehicle doors are closed.

Further, if the vehicle comprises a steering column lock for locking the operation of the steering column, provided with an ignition switch, the function for detecting obstacles is activated only if the ignition switch is in an unlocking position of the steering column lock, meaning the car is not sleeping.

In that case, the method also comprises a preliminary step of verifying if the ignition switch is in an unlocking position.

Advantageously, it is possible to adjust the sensitivity of the optical detector 3, for instance by reducing or increasing the size of the detection area.

At step S10, the optical detector 3 detects if there is any obstacle at the predefined distance from the user vehicle V1.

If an obstacle is detected at step S10, the detection device 1 reacts for example by sending one or more warning signals to the attention of the user U at step S11.

Thus, the same optical detector than the one used for detection approach for a device for opening a movable panel of the vehicle and which is generally intended to be inhibited during the opening movement, is used for detecting a potential obstacle too close from the vehicle, in order to avoid a collision with this obstacle.

The invention claimed is:

1. A detection device for a motor vehicle, comprising:
at least one optical detector, said at least one optical detector being configured for detecting an approach of a person in a predefined area in a vicinity of the vehicle in order to activate opening command means of a device for opening a movable panel of the vehicle;
switching means for switching a function of the at least one optical detector to a detecting function of an obstacle at a predefined distance of the vehicle when an identifier of an authorized person is detected inside the vehicle and the vehicle movable panels are closed; and
processing means configured to output a signal when an obstacle is detected by the optical detector.

2. The detection device of claim 1, the motor vehicle comprising a steering column lock with an ignition switch able to switch from a locking position of the steering column and at least one unlocking position of the steering column, wherein said switching means are configured to switch the function of the at least one optical detector to a detecting function of the obstacle at a predefined distance of the vehicle when the identifier of an authorized person is detected inside the vehicle, the vehicle movable panels are closed and the ignition switch is in an unlocking position.

3. The detection device of claim 1, wherein the signal output by the processing means is a warning signal to the person when the obstacle detected by the optical detector is at a predefined distance of the vehicle.

4. The detection device of claim 3, wherein the warning signal is at least one of a visual signal and a signal tone.

5. The detection device of claim 1, wherein the optical detector is an infrared detector.

6. The detection device of claim 1, wherein the optical detector is configured to detect the obstacle at a predefined distance of the vehicle when an engine of the vehicle is stopped or is idle.

7. The detection device of claim 1, wherein the optical detector is configured to detect the obstacle at a predefined distance of the vehicle when the vehicle is in motion.

8. The detection device of claim 1, wherein the optical detector is configured to detect a moving obstacle.

9. The detection device of claim 1, wherein the optical detector is configured to detect an immobile obstacle.

10. A method for detecting obstacles at a predefined distance of a motor vehicle, comprising:
detecting an identifier of an authorized person inside the vehicle;
detecting if movable panels of said vehicle are closed;
switching a function of at least one optical detector of a detection device as claimed in claim 1 used for approach detection in a control device for opening a movable panel of a motor vehicle to a function for detecting obstacles at the predefined distance of the vehicle;
detecting an obstacle at the predefined distance from the vehicle; and
if an obstacle is detected, warning the authorized person of the vehicle by sending one or more warning signals to alert the authorized person.

11. A method for opening a movable panel of a motor vehicle using a detection device as claimed in claim 1, the method comprising:
detecting an approach of a person in a vicinity of the vehicle by one or more optical detectors of the detection device;
authenticating an identifier of the detected person as authorized to unlock the vehicle through authentication means;
authorizing opening of the movable panel when an authorized person is authenticated; and
deactivating an optical detector function for detecting a person in the vicinity of the vehicle when the identifier of the authorized person is detected inside the vehicle and activating a function of detecting obstacles at a predefined distance of the vehicle.

* * * * *

UNITED STATES PATENT AND TRADEMARK OFFICE
CERTIFICATE OF CORRECTION

PATENT NO. : 9,812,017 B2
APPLICATION NO. : 15/027530
DATED : November 7, 2017
INVENTOR(S) : Krauss et al.

Page 1 of 1

It is certified that error appears in the above-identified patent and that said Letters Patent is hereby corrected as shown below:

On the Title Page

Item (72) should read:
(72) Inventors: Dietmar Krass, Erdweg (DE);
　　　　　　　　Herve Calor, Creteil (FR);
　　　　　　　　Bernd Ette, Creteil (FR)

Signed and Sealed this
Twelfth Day of February, 2019

Andrei Iancu
*Director of the United States Patent and Trademark Office*